US011970027B2

(12) United States Patent
Hashimoto

(10) Patent No.: US 11,970,027 B2
(45) Date of Patent: Apr. 30, 2024

(54) TIRE

(71) Applicant: Sumitomo Rubber Industries, Ltd., Kobe (JP)

(72) Inventor: Yuto Hashimoto, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 57 days.

(21) Appl. No.: 17/347,594

(22) Filed: Jun. 15, 2021

(65) Prior Publication Data
US 2021/0387479 A1    Dec. 16, 2021

(30) Foreign Application Priority Data

Jun. 16, 2020  (JP) .................................. 2020-103863

(51) Int. Cl.
*B60C 11/03* (2006.01)
*B60C 11/12* (2006.01)

(52) U.S. Cl.
CPC ...... *B60C 11/0304* (2013.01); *B60C 11/0306* (2013.01); *B60C 11/1204* (2013.01);
(Continued)

(58) Field of Classification Search
CPC ............... B60C 11/124; B60C 11/1263; B60C 11/1236; B60C 2011/1213;
(Continued)

(56) References Cited

U.S. PATENT DOCUMENTS 6,050,313 A * 4/2000 Tsuda ..................... B60C 11/13
  152/DIG. 3
2011/0220258 A1* 9/2011 Taniguchi ........... B60C 11/1281
  152/209.18

(Continued)

FOREIGN PATENT DOCUMENTS

DE    103 43 614 A1    4/2005
EP    2 138 328 A1    12/2009
(Continued)

OTHER PUBLICATIONS

JPH0632115A Machine Translation (Year: 1994).*
(Continued)

*Primary Examiner* — Justin R Fischer
*Assistant Examiner* — Wendy L Boss
(74) *Attorney, Agent, or Firm* — XSENSUS LLP

(57) ABSTRACT

A main object is to provide a tire that suppresses snow clogging of sipes. The tire includes a tread portion. The tread portion includes a first land portion demarcated by circumferential grooves continuously extending in a tire circumferential direction, and a plurality of first lateral grooves inclined in a first direction relative to a tire axial direction and traversing the first land portion. The first land portion includes a plurality of first blocks demarcated by the first lateral grooves. Each first block has at least one sipe inclined in a second direction opposite to the first direction, relative to the tire axial direction. The sipe includes a portion deeper than a maximum depth of the first lateral groove, and a portion shallower than the maximum depth of the first lateral groove.

15 Claims, 6 Drawing Sheets

(52) U.S. Cl.
CPC ...... *B60C 11/1236* (2013.01); *B60C 11/1263* (2013.01); *B60C 2011/0383* (2013.01); *B60C 2011/1213* (2013.01)

(58) Field of Classification Search
CPC ..... B60C 2011/0374; B60C 2011/0383; B60C 2011/0341; B60C 2011/0367; B60C 2011/1361; B60C 11/0306; B60C 2011/0381; B60C 2011/0358; B60C 2011/1338; B60C 11/1353; B60C 11/1369
See application file for complete search history.

(56) References Cited

U.S. PATENT DOCUMENTS

| | | | | |
|---|---|---|---|---|
| 2012/0145295 | A1* | 6/2012 | Yamada | B60C 11/12 |
| | | | | 152/209.1 |
| 2012/0285591 | A1* | 11/2012 | Nagayasu | B60C 11/0304 |
| | | | | 152/209.8 |
| 2013/0105051 | A1* | 5/2013 | Takahashi | B60C 11/0302 |
| | | | | 152/209.16 |
| 2016/0059638 | A1 | 3/2016 | Matsuda et al. | |
| 2016/0129732 | A1* | 5/2016 | Kurosawa | B60C 11/1236 |
| | | | | 152/209.27 |
| 2018/0056728 | A1 | 3/2018 | Yamakawa | |
| 2018/0236821 | A1 | 8/2018 | Li et al. | |
| 2018/0264892 | A1* | 9/2018 | Wakizono | B60C 11/0306 |
| 2018/0361798 | A1* | 12/2018 | Kurosawa | B60C 11/1204 |
| 2019/0054775 | A1* | 2/2019 | Muller | B60C 11/1307 |
| 2020/0254823 | A1* | 8/2020 | Iida | B60C 11/1263 |
| 2020/0262247 | A1* | 8/2020 | Taniguchi | B60C 11/1204 |
| 2020/0290405 | A1* | 9/2020 | Oda | B60C 11/0306 |

FOREIGN PATENT DOCUMENTS

| | | | | |
|---|---|---|---|---|
| EP | 3135504 A1 | * | 3/2017 | ......... B60C 11/0306 |
| JP | H0632115 A | * | 2/1994 | |
| JP | 2007015596 A | * | 1/2007 | |
| JP | 2018-001804 A | | 1/2018 | |
| WO | 2010/133940 A1 | | 11/2010 | |
| WO | 2015/030101 A1 | | 3/2015 | |

OTHER PUBLICATIONS

JP2007015596 Machine Translation (Year: 2007).*
Extended European Search Report dated Oct. 4, 2021 in European Application No. 21177682.8.

* cited by examiner

TIRE

CROSS-REFERENCE TO RELATED APPLICATION

The present application claims priority to Japanese patent application JP 2020-103863, filed on Jun. 16, 2020, the entire contents of which is incorporated herein by reference in its entirety.

BACKGROUND

Technical Field

The present disclosure relates to a tire.

Description of the Background Art

For example, Japanese Laid-Open Patent Publication No. 2018-001804 proposes a tire capable of exhibiting a particular on-snow performance by specifying a pattern element of a tread portion.

In recent years, tires have been required to have further improved on-snow performance. As a result of various experiments, the present inventor has found that on-snow performance can be further improved by suppressing snow clogging of sipes, and has completed the present disclosure.

The present disclosure has been made in view of the above-described circumstances, wherein an object of the present disclosure, of one or more objects, is to provide a tire that suppresses snow clogging of sipes.

SUMMARY

The present disclosure is directed to a tire including a tread portion, wherein the tread portion includes a first land portion demarcated by a pair of circumferential grooves each continuously extending in a tire circumferential direction, and a plurality of first lateral grooves each inclined in a first direction relative to a tire axial direction and traversing the first land portion, the first land portion includes a plurality of first blocks demarcated by the first lateral grooves, each said first block has at least one sipe inclined in a second direction opposite to the first direction, relative to the tire axial direction, and each said at least one sipe includes a first portion deeper than a maximum depth of each said first lateral groove, and a second portion shallower than the maximum depth of each said first lateral groove.

The present disclosure is also directed to a tire including a tread portion, wherein the tread portion includes a first land portion demarcated by a pair of circumferential grooves each continuously extending in a tire circumferential direction, and a plurality of first lateral grooves each inclined in a first direction relative to a tire axial direction and traversing the first land portion, the first land portion includes a plurality of first blocks demarcated by the first lateral grooves, each said first block has at least one sipe inclined in a second direction opposite to the first direction, relative to the tire axial direction, each said at least one sipe includes a first portion deeper than a maximum depth of each said first lateral groove, and a second portion shallower than the maximum depth of each said first lateral groove, each said at least one sipe includes a tie bar raised outwardly in a tire radial direction from a bottom of the sipe, and for each said at least one sipe, the tie bar is provided at a position overlapping a center in a longitudinal direction of the sipe, a height in the tire radial direction of the tie bar is 40% to 70% of a maximum depth of the sipe, the sipe extends in a zigzag manner in the longitudinal direction thereof, and a width in the tire axial direction of the tie bar is 10% to 40% of a wavelength of the sipe.

DESCRIPTION OF THE PREFERRED EMBODIMENTS

Hereinafter, an embodiment of the present disclosure will be described with reference to the drawings. Ranges described herein are inclusive unless otherwise specified.

Figure 1:
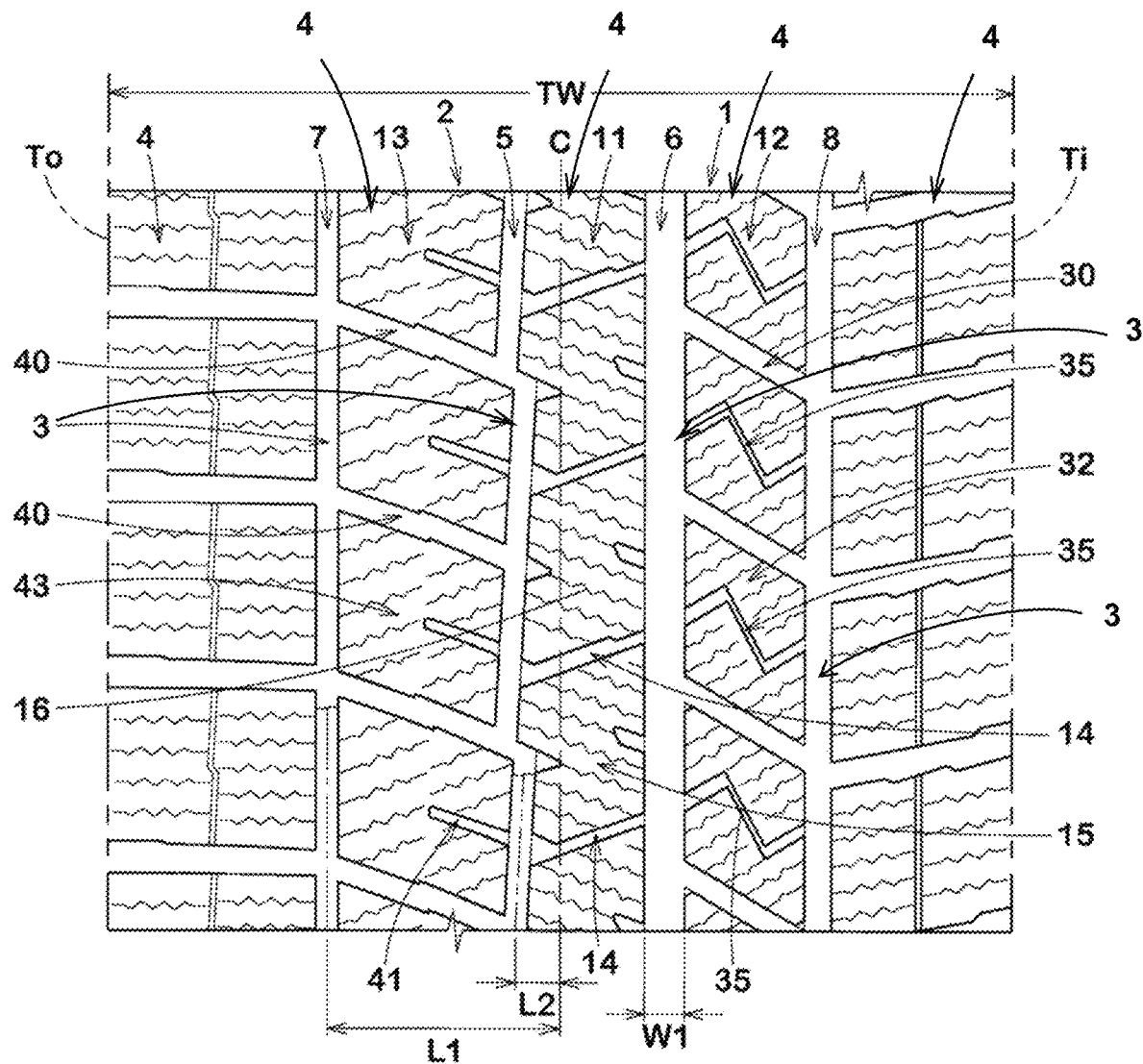
FIG. 1 is a development of a tread portion of a tire according to an embodiment of the present disclosure.

FIG. 1 is a development of a tread portion 2 of a tire 1 according to the present embodiment. As shown in FIG. 1, the tire 1 according to the present embodiment can be used, for example, as a pneumatic tire, for a passenger car, which can be intended for use in winter. However, the tire 1 according to the present disclosure is not limited to such a mode.

The tire 1 according to the present embodiment has the tread portion 2 having a designated mounting direction to a vehicle, for example. The mounting direction to the vehicle can be indicated, for example, on a sidewall portion or the like by characters or marks.

The tread portion 2 can include four circumferential grooves 3 continuously extending in a tire circumferential direction (vertical with reference to FIG. 1) between an outer tread end To and an inner tread end Ti, and five land portions 4 demarcated by the circumferential grooves 3. That is, the tire 1 according to the present disclosure can be configured as a so-called 5-rib tire. However, the tire 1 according to the present disclosure is not limited to such a configuration, and may be, for example, a so-called 4-rib tire that can include three circumferential grooves 3 and four land portions 4.

The outer tread end To can be a tread end intended to be located on the outer side of the vehicle when the tire 1 is mounted on the vehicle, and the inner tread end Ti can be a tread end intended to be located on the inner side of the vehicle when the tire 1 is mounted on the vehicle. Each of the outer tread end To and the inner tread end Ti can correspond to a ground contact position on the outermost side in the tire axial direction (horizontal with reference to FIG. 1) when a normal load is applied to the tire 1 in a normal state and the tire 1 is brought into contact with a flat surface at a camber angle of 0°.

In the case of a pneumatic tire for which various standards are defined, the "normal state" can mean a state where the tire is fitted on a normal rim and inflated to a normal internal pressure and no load is applied to the tire. In the case of a non-pneumatic tire or a tire for which various standards are not defined, the normal state can mean a standard use state, corresponding to the purpose of use of the tire, where no load is applied to the tire. In the present specification, unless otherwise specified, dimensions and the like of components of the tire 1 are values measured in the normal state. It should be noted that each configuration described in the present specification tolerates the usual errors contained in a rubber molded product.

The "normal rim" is a rim that can be defined, in a standard system including a standard on which the tire is based, by the standard for each tire, and can be, for example, the "standard rim" in the JATMA standard, the "Design Rim" in the TRA standard, or the "Measuring Rim" in the ETRTO standard.

The "normal internal pressure" is an air pressure that can be defined, in a standard system including a standard on which the tire is based, by the standard for each tire, and can be the "maximum air pressure" in the JATMA standard, the maximum value indicated in the table "TIRE LOAD LIMITS AT VARIOUS COLD INFLATION PRESSURES" in the TRA standard, or the "INFLATION PRESSURE" in the ETRTO standard.

In the case of a pneumatic tire for which various standards are defined, the "normal load" is a load that can be defined, in a standard system including a standard on which the tire is based, by the standard for each tire, and can be the "maximum load capacity" in the JATMA standard, the maximum value indicated in the table "TIRE LOAD LIMITS AT VARIOUS COLD INFLATION PRESSURES" in the TRA standard, or the "LOAD CAPACITY" in the ETRTO standard. In addition, in the case of a non-pneumatic tire or a tire for which various standards are not defined, the "normal load" can be a load applied to one tire in a standard use state of tires. The "standard use state" can refer to a state where the tires are mounted on a standard vehicle corresponding to the purpose of use of the tires and the vehicle is stationary on a flat road surface in a state where the vehicle can run.

The circumferential grooves 3 can include, for example, an outer crown circumferential groove 5, an inner crown circumferential groove 6, an outer shoulder circumferential groove 7, and an inner shoulder circumferential groove 8. The outer crown circumferential groove 5 can be provided between a tire equator C and the outer tread end To. The inner crown circumferential groove 6 can be provided between the tire equator C and the inner tread end Ti. The outer shoulder circumferential groove 7 can be provided between the outer crown circumferential groove 5 and the outer tread end To. The inner shoulder circumferential groove 8 can be provided between the inner crown circumferential groove 6 and the inner tread end Ti.

As for the circumferential grooves 3, various modes, such as grooves extending in a straight manner in the tire circumferential direction and grooves extending in a zigzag manner, can be adopted. In the present embodiment, the inner crown circumferential groove 6, the inner shoulder circumferential groove 8, and the outer shoulder circumferential groove 7 can extend in a straight manner so as to be parallel to the tire circumferential direction. Meanwhile, the outer crown circumferential groove 5 can extend in a zigzag manner. However, the tire 1 according to the present disclosure is not limited to such a mode.

A distance L1 in the tire axial direction from a groove center line of the outer shoulder circumferential groove 7 or the inner shoulder circumferential groove 8 to the tire equator C can be, for example, 20% to 35% of a tread width TW. A distance L2 in the tire axial direction from a groove center line of the outer crown circumferential groove 5 or the inner crown circumferential groove 6 to the tire equator C can be, for example, 3% to 15% of the tread width TW. The distance in the tire axial direction from the groove center line of the inner crown circumferential groove 6 to the tire equator C can be greater than the distance in the tire axial direction from the groove center line of the outer crown circumferential groove 5 to the tire equator C. The tread width TW can referred to or be defined as the distance in the tire axial direction from the outer tread end To to the inner tread end Ti in the normal state.

A groove width W1 of each circumferential groove 3 can be at least not less than 3 mm. The groove width W1 of each circumferential groove 3 can be 2.0% to 5.0% of the tread width TW. In the present embodiment, among the four circumferential grooves 3, the inner crown circumferential groove 6 can have the largest groove width.

The land portions 4 can include a first land portion 11. The first land portion 11 of the present embodiment is demarcated, for example, between the outer crown circumferential groove 5 and the inner crown circumferential groove 6. However, the position of the first land portion 11 is not limited to such a mode.

Figure 2:
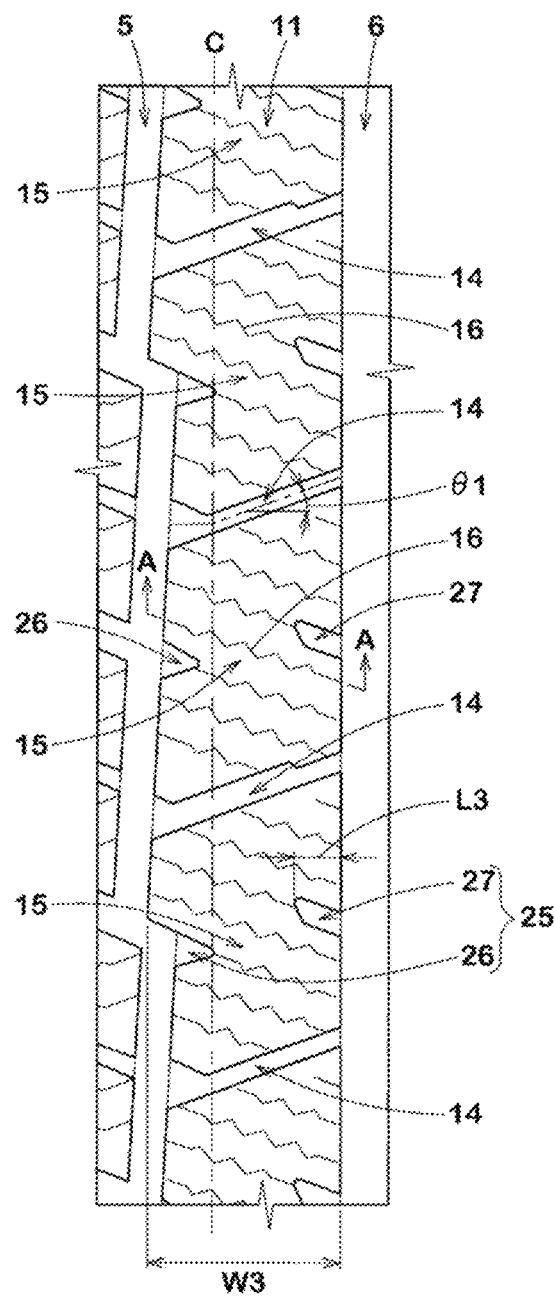
FIG. 2 is an enlarged view of a first land portion in FIG. 1.

FIG. 2 shows an enlarged view of the first land portion 11. As shown in FIG. 2, the first land portion 11 can have a plurality of first lateral grooves 14. Each first lateral groove 14 can traverse the first land portion 11 so as to be inclined in a first direction (upward toward the right side in each drawing of the present application) relative to the tire axial direction. Accordingly, the first land portion 11 can include a plurality of first blocks 15 demarcated by the first lateral grooves 14.

Each first block 15 can have at least one sipe 16 inclined in a second direction (downward toward the right side in each drawing of the present application) opposite to the first direction, relative to the tire axial direction. The sipe 16 may be referred to herein as a first sipe 16. In the case where the sipe 16 extends in a zigzag manner as in the present embodiment, the direction in which the sipe 16 is inclined can be determined as the direction in which a virtual straight line connecting both ends of the sipe 16 is inclined.

In the present specification, "sipe" can refer to a cut element having a minute width and having a width of 1.5 mm or less between two sipe walls facing each other. The width of the sipe can be 0.1 to 1.0 mm or 0.2 to 0.8 mm. The width of the sipe of the present embodiment can be in the above range over the entire depth thereof. In the present specification, in a transverse cross-section of a certain cut element, when a region with a width of 1.5 mm or less is included over 50% or more of the entire depth, even if a region with a width exceeding 1.5 mm is partially included, the cut element can be treated as a sipe (sipe including a groove element). In addition, in a transverse cross-section of a certain cut element, when a region with a width larger than 1.5 mm is included over 50% or more of the entire depth, even if a region with a width of 1.5 mm or less is partially included, the cut element can be treated as a groove (groove including a sipe element).

Figure 3:
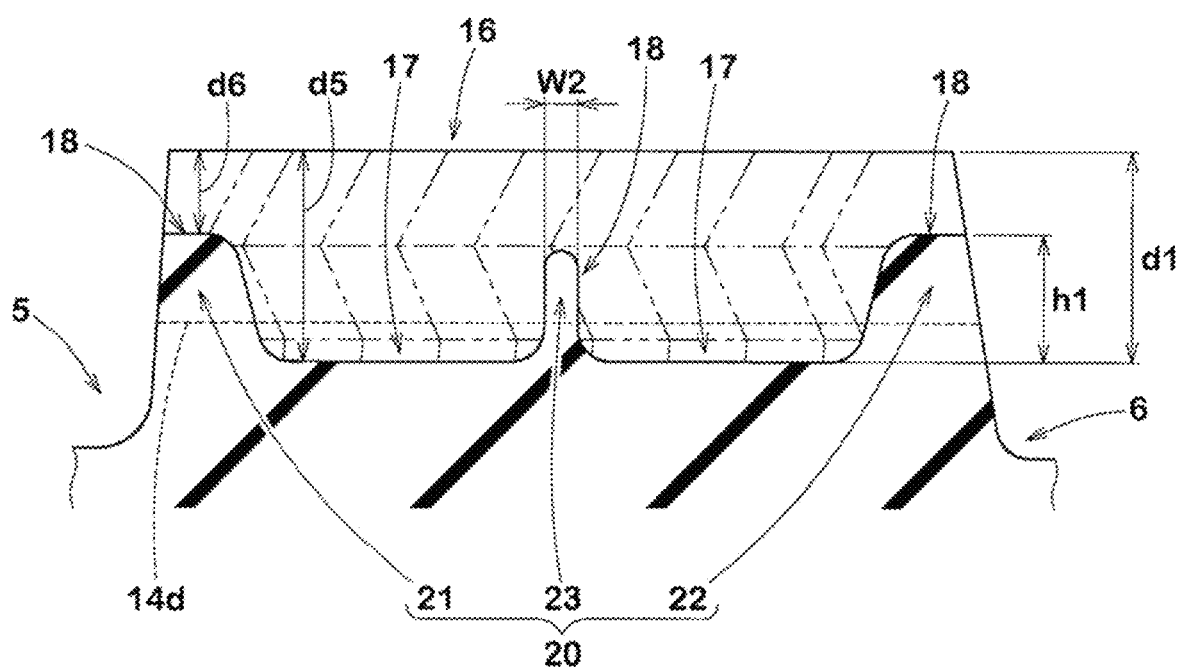
FIG. 3 is a cross-sectional view taken along a line A-A in FIG. 2.

FIG. 3 shows a cross-sectional view taken along a line A-A in FIG. 2. As shown in FIG. 3, the sipe 16 can include a portion 17 (hereinafter, sometimes referred to as a first portion 17) deeper than the maximum depth of the first lateral groove 14 (shown in FIG. 2, the same applies below) and a portion 18 (hereinafter, sometimes referred to as a second portion 18) shallower than the maximum depth of the first lateral groove 14. In FIG. 3, a groove bottom 14d of the first lateral groove 14 is shown by a broken line. As a result of adopting the above configuration, the tire 1 according to the present disclosure can effectively suppress snow clogging of the sipes, for instance, sipes 16. As for the reason for this, the following mechanism can be inferred. In the present specification, the "suppression of snow clogging" is not limited to suppression of clogging with snow, but also may include suppression of clogging of the sipes, for instance, sipes 16, with fine ice pieces.

Since each first lateral groove 14 and each sipe 16 can have different inclination directions, when a ground-contact pressure is applied to the tread portion 2, the sipe 16 can become closed at a portion close to the first lateral groove 14 and then can become closed at a portion far from the first lateral groove 14. The same applies when the ground-contact pressure applied to the tread portion 2 becomes smaller and the sipe 16 becomes opened. Owing to the opening/closing behavior of the sipe 16, snow can be easily removed therefrom, so that snow clogging can be suppressed.

Moreover, since the sipe 16 can include the first portion 17 and the second portion 18, the sipe 16 can cause the above-described opening/closing behavior including a portion having a relatively large opening amount and a portion having a relatively small opening amount. Accordingly, it is considered that the sipe 16 may relatively more easily become opened and closed in a wavy manner, which may make it relatively easier for snow in the sipe 16 to be removed. In addition, when snow clogging of the sipe 16 is suppressed, the edge of the sipe 16 can exert sufficient frictional force to improve on-ice performance. Furthermore, a decrease in the groove volume of each groove that demarcates each first block 15, due to the snow clogging, can be suppressed, so that on-snow performance can be improved.

Hereinafter, more detailed configurations of the present embodiment will be described. The configurations described below show a specific mode of the present embodiment. Therefore, it is needless to say that the present disclosure can achieve the above-described effect (and other effects) even when the configurations described below are not provided. In addition, even when any one of the configurations described below is independently applied to the tire 1 according to the present disclosure having the above-described characteristics, performance improvement corresponding to each configuration can be expected. Furthermore, when some of the configurations described below are applied in combination, complex performance improvement corresponding to each configuration can be expected.

As shown in FIG. 2, the first land portion 11 can be provided, for example, on the tire equator C. According to one or more embodiments, the center position in the tire axial direction of the first land portion 11 can be located on the inner tread end Ti side with respect to the tire equator C.

Each first lateral groove 14 can be inclined in the first direction, for example, at an angle of 45° or less relative to the tire axial direction. For instance, angle θ1 of the first lateral groove 14 relative to the tire axial direction can be 15 to 25°. Such first lateral groove 14 can serve to improve turning performance on snow. In the present specification, the angle θ1 of the first lateral groove 14 is measured at a groove center line thereof.

In a further mode, the groove width of an end portion on the outer crown circumferential groove 5 side of each first lateral groove 14 of the present embodiment can increase toward the outer crown circumferential groove 5 side. Such a first lateral groove 14 can relatively strongly compact snow at the end portion and thus can enhance on-snow performance.

The maximum depth of each first lateral groove 14 can be, for example, 4.0 to 7.0 mm. Each first lateral groove 14 of the present embodiment can have a uniform depth over the entirety thereof. However, the first lateral groove 14 is not limited to such a mode.

The sipes 16 (hereinafter, sometimes referred to as first sipes 16) provided on the first blocks 15 can extend, for example, in a zigzag manner in a tread plan view, such as shown in FIG. 2. The peak-to-peak amplitude of each first sipe 16 can be, for example, 0.50 to 2.00 mm or 1.20 to 1.50 mm. The wavelength of each first sipe 16 can be, for example, 2.0 to 5.0 mm. When the sipe walls, facing each other, of such a first sipe 16 come into contact with each other, the apparent stiffness of the first block 15 can be increased. However, the first sipe 16 is not limited to such a mode, and, for example, may extend in a straight manner.

Each first block 15 can have a plurality of first sipes 16. The shortest distance between the adjacent first sipes 16 can be, for example, 2.0 to 5.0 mm. In the case where a plurality of first sipes 16 extending in a zigzag manner are provided as in the present embodiment, the shortest distance between the center lines of the first sipes 16 can be 3.0 to 6.0 mm. Accordingly, multiple (e.g., many) first sipes 16 can be provided while maintaining the stiffness of the first block 15.

The angle of each first sipe 16 relative to the tire axial direction can be, for example, 15 to 25°. In the case where the first sipe 16 extends in a zigzag manner, the angle is measured at a virtual straight line connecting both ends of the first sipe 16. The angle between the first sipe 16 and the first lateral groove 14 can be 35 to 45°.

As shown in FIG. 3, the first sipe 16 can be formed as a so-called 3D sipe extending also in a zigzag manner in the depth direction thereof. Accordingly, the stiffness of the first block 15 can be more reliably maintained. In FIG. 3, the apices of bends of the first sipe 16 are shown by two-dot chain lines.

A maximum depth d5 of the first portion 17 of the first sipe 16 can be 105% to 145%, 110% to 140%, or 115% to 135% of the maximum depth of the first lateral groove 14. In addition, a minimum depth d6 of the second portion 18 of the first sipe 16 can be 30% to 70%, 35% to 65%, or 40% to 60% of the maximum depth of the first lateral groove 14.

The total length, along the longitudinal direction of the first sipe 16, of the second portion 18, can be less than the total length, along the longitudinal direction, of the first portion 17. For instance, the total length of the second portion 18 can be 20% to 40% of the length of the first sipe 16. The total length of the first portion 17 can be 60% to 80% of the length of the first sipe 16, as an example. The arrangement of such first portion 17 and second portion 18 can reliably suppress snow clogging while maintaining the stiffness of the first block 15.

Each first sipe 16 can include a tie bar 20 raised outwardly in the tire radial direction from the bottom thereof (e.g., upward with respect to FIG. 3). The tie bar 20 of the present embodiment can include a first tie bar 21 provided at one end portion in the tire axial direction of the first sipe 16, a second tie bar 22 provided at another end portion in the tire axial direction of the first sipe 16, and a third tie bar 23 provided between the first tie bar 21 and the second tie bar 22. Accordingly, the opening amount of the first sipe 16 can be reliably decreased, so that snow clogging of the first sipe 16 can be further suppressed.

In order to further enhance the above-described effect, the third tie bar 23 can be provided, for example, at a position overlapping the center in the longitudinal direction of the first sipe 16.

A maximum height h1 in the tire radial direction of the tie bar 20 can be 40% to 70% of a maximum depth d1 of the first sipe 16. Accordingly, snow clogging can be suppressed while maintaining on-ice performance.

From the same viewpoint, a width W2 in the tire axial direction of one tie bar 20 can be 10% to 40% of the wavelength of the first sipe 16 in the tread plan view. The width W2 of the tie bar 20 can be measured at the center position in the height direction of the tie bar 20. Optionally, the width W2 can correspond to the width of the third tie bar 23.

The width in the tire axial direction of the third tie bar 23 can be less than the width in the tire axial direction of the first tie bar 21 or the width in the tire axial direction of the second tie bar 22. For instance, the width of the third tie bar 23 can be 30% to 50% of the width of the first tie bar 21 or the second tie bar 22. In addition, the height in the tire radial direction of the third tie bar 23 can be less than the height in the tire radial direction of the first tie bar 21 or the height in the tire radial direction of the second tie bar 22. For instance, the height of the third tie bar 23 can be 75% to 95% of the height of the first tie bar 21 or the second tie bar 22. Such third tie bar 23 can increase frictional force provided by the edge of the first sipe 16 and thus can enhance on-ice performance.

The total width of the tie bar 20 along the longitudinal direction of the first sipe 16 can be, for example, 15% to 35% or 20% to 30%, of the length of the first sipe 16.

As shown in FIG. 2, the first land portion 11 of the present embodiment can have second lateral grooves 25 in communication with the circumferential grooves 3 and that terminate within the first blocks 15. Specifically, each second lateral groove 25 can include an outer second lateral groove 26 in communication with the outer crown circumferential groove 5, and an inner second lateral groove 27 in communication with the inner crown circumferential groove 6. Such a second lateral groove 25 can improve on-ice performance and on-snow performance while maintaining the first block 15.

The second lateral groove 25 can terminate within the first land portion 11 without crossing the center position in the tire axial direction of the first land portion 11. A length L3 in the tire axial direction of the second lateral groove 25 can be, for example, 20% to 30% of a maximum width W3 in the tire axial direction of the first land portion 11.

The second lateral groove 25 can be, for example, inclined in the second direction. The angle of the second lateral groove 25 relative to the tire axial direction can be, for example, 15 to 25°. Accordingly, the first sipe 16 may more easily become opened and closed, so that snow clogging of the first sipe 16 can be further suppressed.

The maximum depth of the second lateral groove 25 can be set to, for example, ±2 mm of the maximum depth of the first lateral groove 14. In one or more modes, the maximum depth of the second lateral groove 25 and the maximum depth of the first lateral groove 14 can be equal to each other. Accordingly, the first sipe 16 can include a portion deeper than the maximum depth of the second lateral groove 25, and a portion shallower than the maximum depth of the second lateral groove 25. The portion deeper than the maximum depth of the second lateral groove 25 may be the above-discussed first portion 17, and the portion shallower than the maximum depth of the second lateral groove 25 may be the above-discussed second portion 18.

As shown in FIG. 1, the tread portion 2 of the present embodiment can include a second land portion 12 and a third land portion 13 in addition to the above-described first land portion 11. The second land portion 12 can be adjacent to the inner tread end Ti side of the first land portion 11 and demarcated between the inner crown circumferential groove 6 and the inner shoulder circumferential groove 8. The third land portion 13 can be adjacent to the outer tread end To side of the first land portion 11 and demarcated between the outer crown circumferential groove 5 and the outer shoulder circumferential groove 7.

Figure 4:
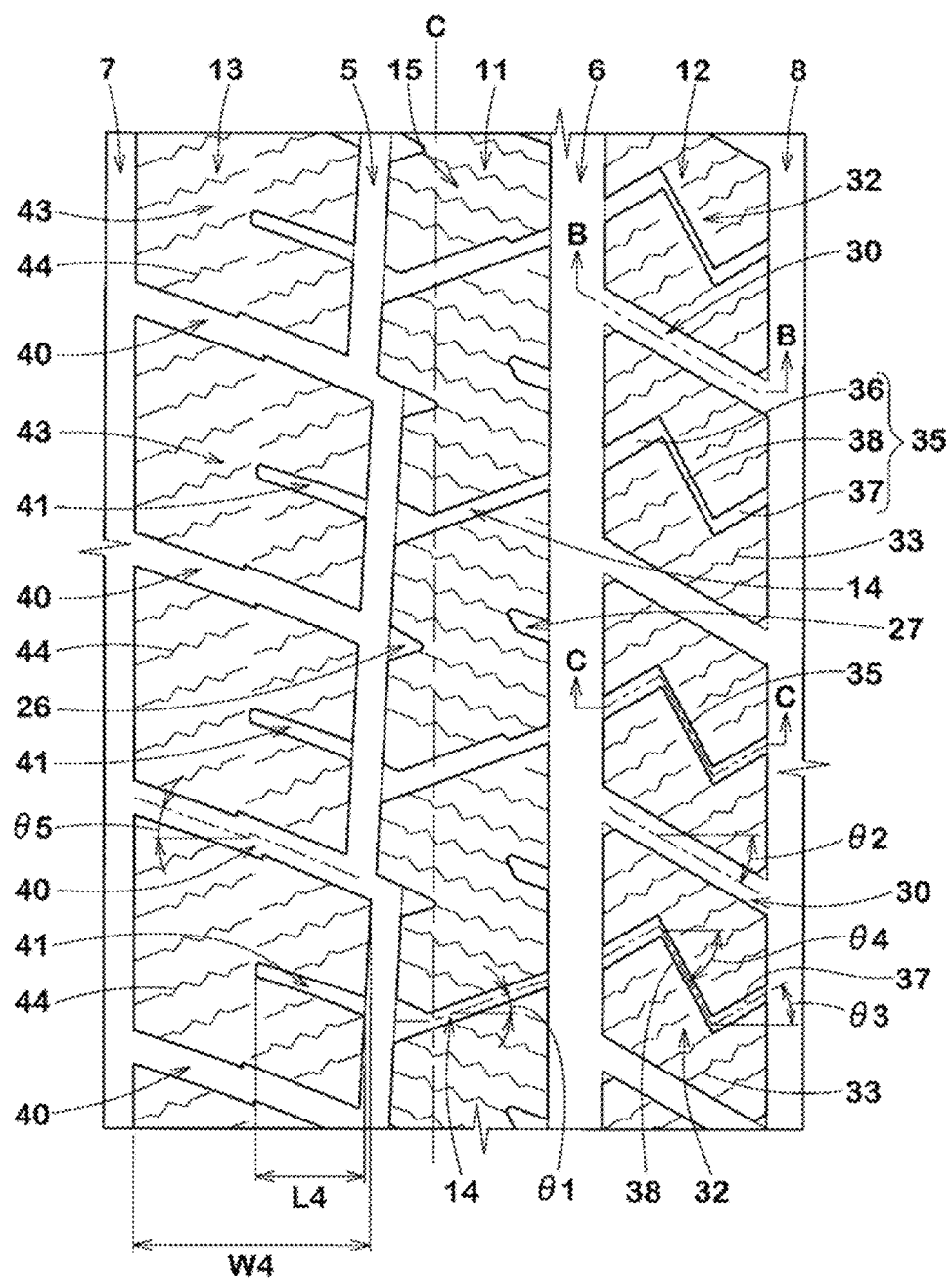
FIG. 4 is an enlarged view of the first land portion, a second land portion, and a third land portion in FIG. 1.

FIG. 4 shows an enlarged view of the first land portion 11, the second land portion 12, and the third land portion 13. As shown in FIG. 4, the second land portion 12 can have a plurality of third lateral grooves 30. Accordingly, the second land portion 12 can include a plurality of second blocks 32 demarcated by the third lateral grooves 30.

The plurality of third lateral grooves 30 can be inclined in the same direction relative to the tire axial direction. Each third lateral groove 30 of the present embodiment can be inclined in the second direction. An angle θ2 of the third lateral groove 30 relative to the tire axial direction can be greater than the angle θ1 of the first lateral groove 14 relative to the tire axial direction. For instance, the angle θ2 of the third lateral groove 30 can be 20 to 40°. Such third lateral groove 30 can improve traction performance and turning performance on snow.

Each third lateral groove 30 of the present embodiment can extend, for example, in a straight manner with a uniform groove width. The groove width of the third lateral groove 30 can be, for example, 1.0 to 8.0 mm or 2.0 to 6.0 mm.

Figure 5:
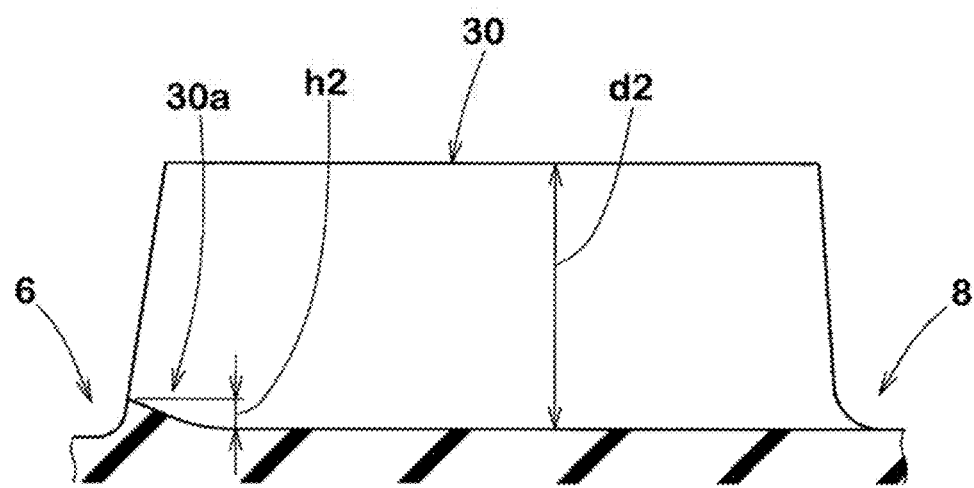
FIG. 5 is a cross-sectional view taken along a line B-B in FIG. 4.

FIG. 5 shows a cross-sectional view taken along a line B-B in FIG. 4. As shown in FIG. 5, a maximum depth d2 of the third lateral groove 30 can be, for example, 3.0 to 11.0 mm or 6.0 to 9.5 mm. The maximum depth d2 of the third lateral groove 30 can be greater than the maximum depth of the first lateral groove 14. According to one or more embodiments, the maximum depth d2 of the third lateral groove 30 can be greater than the maximum depth d1 of the first sipe 16. Accordingly, the third lateral groove 30 may more easily become opened, so that snow can be minimized or prevented from being held in the third lateral groove 30 and the inner crown circumferential groove 6 (shown in FIG. 4).

The groove bottom surface of the third lateral groove 30 can include, for example, a projection 30a partially projecting outwardly in the tire radial direction. The projection 30a can be provided, for example, at an end portion in the tire axial direction of the third lateral groove 30. In the present embodiment, the projection 30a can be provided at an end portion on the inner crown circumferential groove 6 side of the third lateral groove 30. A height h2 in the tire radial direction of the projection 30a can be, for example, 0.5 to 2.0 mm. The length in the tire axial direction of the projection 30a can be not greater than 30% or 5% to 15%, of the length in the tire axial direction of the third lateral groove 30. Such projection 30a can minimize or prevent clogging of the third lateral groove 30 with snow and ice fragments.

As shown in FIG. 4, the end portion on the inner crown circumferential groove 6 side of each third lateral groove 30 may not overlap a virtual region obtained by extending an end portion on the inner crown circumferential groove 6 side of the first lateral groove 14 so as to be parallel to the tire axial direction. Similarly, the end portion on the inner crown circumferential groove 6 side of each third lateral groove 30 may not overlap a virtual region obtained by extending an end portion on the inner crown circumferential groove 6 side of the inner second lateral groove 27 so as to be parallel to the tire axial direction. The arrangement of such third lateral grooves 30 can reliably minimize or prevent snow from being held in the inner crown circumferential groove 6.

Each second block 32 can have a bent groove 35 that traverses the second block 32. The bent groove 35 can include, for example, a first inclined portion 36 that is connected to the inner crown circumferential groove 6 and that extends so as to be inclined in the first direction, a second inclined portion 37 that is connected to the inner shoulder circumferential groove 8 and that extends so as to be inclined in the first direction, and a third inclined portion 38 that communicates with the first inclined portion 36 and the second inclined portion 37 and that extends so as to be inclined in the second direction.

The first inclined portion 36 and the second inclined portion 37 can be inclined, for example, at a larger angle relative to the tire axial direction than the first lateral groove 14. An angle θ3 of the first inclined portion 36 and the second inclined portion 37 relative to the tire axial direction, can be, for example, 20 to 40°.

The third inclined portion 38 can be inclined, for example, at a larger angle relative to the tire axial direction than the first lateral groove 14. An angle θ4 relative to the tire axial direction of the third inclined portion 38 can be, for example, 50 to 70°. In addition, the angle between the first inclined portion 36 and the third inclined portion 38 and the angle between the second inclined portion 37 and the third inclined portion 38 can each be 80 to 100°. The bent groove 35 including such third inclined portion 38 can exert frictional force in multiple (e.g., many) directions to improve on-ice performance, and can strongly compact snow therein and thus also can improve on-snow performance.

Figure 6:
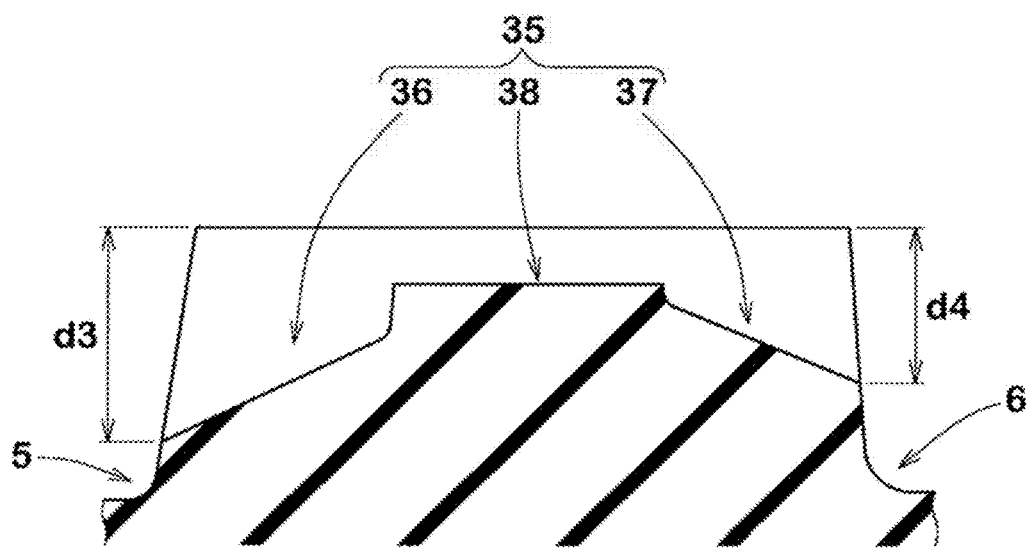
FIG. 6 is a cross-sectional view taken along a line C-C in FIG. 4.

FIG. 6 shows a cross-sectional view taken along a line C-C in FIG. 4. As shown in FIG. 6, the depth of each of the first inclined portion 36 and the second inclined portion 37 can be greater than the depth of the third inclined portion 38. In addition, the depth of each of the first inclined portion 36 and the second inclined portion 37 can increase from the third inclined portion 38 side toward an end of the bent groove 35. In a particular mode, a maximum depth d3 of the first inclined portion 36 can be greater than a maximum depth d4 of the second inclined portion 37. Accordingly, the stiffness of the second block 32 can increase toward the inner tread end Ti side, and thus steering stability on a dry road surface can be improved.

As shown in FIG. 4, each second block 32 can have a plurality of second sipes 33 extending so as to be inclined in the first direction. The maximum depth of each second sipe 33 of the present embodiment can be 0.90 to 1.10 times the maximum depth of the first sipe 16, and the depths of these sipes can be equal to each other in a at least one mode. Accordingly, snow clogging of the second sipe 33 can be suppressed.

In a particular mode, each second sipe 33 may not communicate with the bent groove 35. Accordingly, a decrease in the stiffness of the second block 32 can be suppressed, so that steering stability on a dry road surface can be improved.

Each second sipe 33 can be formed, for example, as a 3D sipe extending in a wavy manner in the longitudinal direction and the depth direction. In addition, the dimensions of the above-described first sipe 16 can be applied to various dimensions (e.g., some or all) of the second sipe 33.

The third land portion 13 can have a plurality of fourth lateral grooves 40 that fully traverse the third land portion 13, and a plurality of termination grooves 41 that can be connected to the outer crown circumferential groove 5 and can terminate within the third land portion 13.

Each fourth lateral groove 40 can be, for example, inclined in the second direction. An angle θ5 of the fourth lateral groove 40 relative to the tire axial direction can be, for example, 15 to 30°. Such fourth lateral groove 40 can improve traction performance and/or turning performance on snow in a well-balanced manner.

Each fourth lateral groove 40 can face the outer second lateral groove 26 across the outer crown circumferential groove 5. This configuration can mean a mode in which a virtual region obtained by extending the fourth lateral groove 40 along the longitudinal direction thereof to the first land portion 11 side overlaps at least a part of the outer second lateral groove 26. Accordingly, the fourth lateral groove 40, the outer crown circumferential groove 5, and the outer second lateral groove 26 can cooperate to form a hard snow column, and as a result, on-snow performance can be further improved.

Each termination groove 41 can be, for example, inclined in the second direction. Accordingly, each termination groove 41 can be inclined in the same direction relative to the tire axial direction as each fourth lateral groove 40. An angle of the termination groove 41 relative to the tire axial direction can be, for example, 15 to 30°.

A length L4 in the tire axial direction of each termination groove 41 can be, for example, 40% to 60% of a maximum width W4 in the tire axial direction of the third land portion 13. In addition, the maximum groove width of each termination groove 41 can be less than the maximum groove width of each fourth lateral groove 40. Such termination groove 41 can enhance on-snow performance while maintaining the stiffness of the second land portion 12.

In a particular mode, a virtual region obtained by extending an end portion on the outer crown circumferential groove 5 side of each termination groove 41 so as to be parallel to the tire axial direction can overlap at least a part of the end portion on the outer crown circumferential groove 5 side of the first lateral groove 14. Accordingly, the termination groove 41, the outer crown circumferential groove 5, and the first lateral groove 14 can cooperate to compact snow, so that on-snow performance can be improved.

The third land portion 13 can include a plurality of third blocks 43 demarcated by the plurality of fourth lateral grooves 40. Each third block 43 can have a plurality of third sipes 44. Each third sipe 44 can be, for example, inclined in the first direction. The configuration of the above-described first sipe 16 can be applied to each third sipe 44.

As shown in FIG. 2, in order to improve steering stability on a dry road surface and on-ice performance in a well-balanced manner, a land ratio of the tread portion 2 can be 60% to 75%. In the present specification, the land ratio can mean the ratio of the total area of an actual ground-contact surface of the tread portion 2 to the total area of a virtual ground-contact surface obtained by filling all the grooves of the tread portion 2.

From the same viewpoint, a rubber hardness of a tread rubber forming the tread portion 2 can be, for example, 45 to 65°. Here, the rubber hardness can refer to a durometer A hardness measured with a type A durometer in the environment at 23° C. according to JIS-K6253.

Although the tire according to the embodiment of the present disclosure has been described in detail above, the present disclosure is not limited to the above specific embodiment, and various modifications can be made to implement the present disclosure.

Examples

Figure 7:
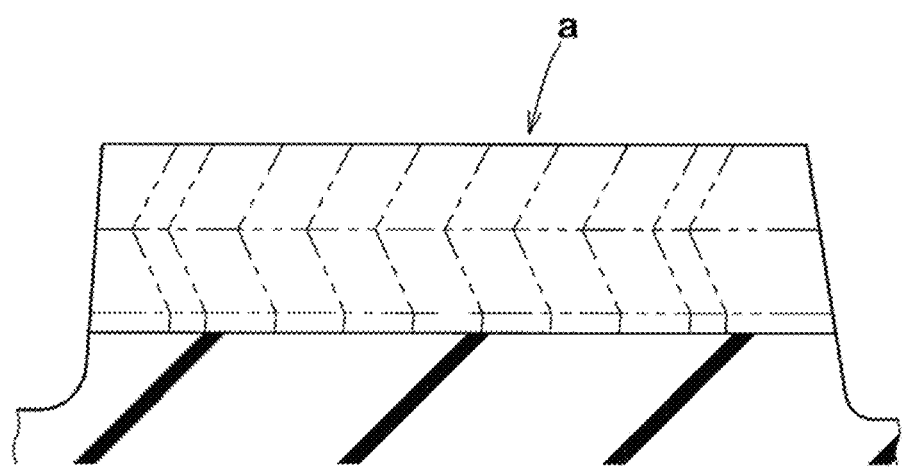
FIG. 7 is a cross-sectional view of a sipe of a comparative example.

Tires with a size of 195/65R15 having the basic tread pattern in FIG. 1 were produced as test tires on the basis of specifications in Table 1. As a comparative example, a tire having a first sipe a having no tie bar as shown in FIG. 7 was produced as a test tire. In the tire of the comparative example, the entirety of the first sipe 'a' is larger than the maximum depth of the first lateral groove. The tire of the comparative example has substantially the same configuration as shown in FIG. 1, except for the above-described configuration. Each test tire was tested for on-ice performance and on-snow performance. The common specifications and the test methods for the respective test tires are as follows.

Mount rim: 15×6.0JJ
Tire internal pressure: 230 kPa for front wheels, 230 kPa for rear wheels
Test vehicle: a front-wheel-drive car having an engine displacement of 1500 cc
Tire mounted position: all wheels <On-Ice Performance>
Sensory evaluation was made by a driver for running performance when the test vehicle ran on ice. The results are shown as scores with the result of the comparative example being regarded as 100. A higher value indicates that the on-ice performance is better.

<On-Snow Performance>
Sensory evaluation was made by a driver for running performance when the test vehicle ran on snow. The results are shown as scores with the result of the comparative example being regarded as 100. A higher value indicates that the on-snow performance is better.

The test results are shown in Table 1.

In the tire according to the present disclosure, the tie bar can be provided at a position overlapping a center in a longitudinal direction of the sipe.

In the tire according to the present disclosure, a height in the tire radial direction of the tie bar can be 40% to 70% of a maximum depth of the sipe.

In the tire according to the present disclosure, the sipe can extend in a zigzag manner in the longitudinal direction thereof, and a width in the tire axial direction of the tie bar can be 10% to 40% of a wavelength of the sipe.

In the tire according to the present disclosure, each first block can have a second lateral groove that communicates with the circumferential groove and that terminates within the first block, and the sipe can include a portion deeper than a maximum depth of the second lateral groove, and a portion shallower than the maximum depth of the second lateral groove.

In the tire according to the present disclosure, a maximum depth of the portion, deeper than the maximum depth of the first lateral groove, of the sipe can be 105% to 145% of the maximum depth of the first lateral groove.

In the tire according to the present disclosure, a minimum depth of the portion, shallower than the maximum depth of the first lateral groove, of the sipe can be 30% to 70% of the maximum depth of the first lateral groove.

In the tire according to the present disclosure, the first land portion can be provided on a tire equator, and a center position in the tire axial direction of the first land portion can be located on an inner tread end side with respect to the tire equator.

TABLE 11

|  | Comparative Example | Example 1 | Example 2 | Example 3 | Example 4 |
|---|---|---|---|---|---|
| Drawing showing first sipe | FIG. 7 | FIG. 3 | FIG. 3 | FIG. 3 | FIG. 3 |
| Depth of first portion/ depth of first lateral groove (%) | — | 125 | 115 | 120 | 130 |
| Depth of second portion/ depth of first lateral groove (%) | — | 50 | 40 | 45 | 55 |
| Total width of tie bar/ length of first sipe (%) | — | 25 | 25 | 25 | 25 |
| On-ice performance (score) | 100 | 104 | 103 | 104 | 104 |
| On-snow performarce (score) | 100 | 106 | 106 | 106 | 105 |

|  | Example 5 | Example 6 | Example 7 | Example 8 | Example 9 |
|---|---|---|---|---|---|
| Drawing showing first sipe | FIG. 3 | FIG. 3 | FIG. 3 | FIG. 3 | FIG. 3 |
| Depth of first portion/ depth of first lateral groove (%) | 135 | 125 | 125 | 125 | 125 |
| Depth of second portion/ depth of first lateral groove (%) | 60 | 50 | 50 | 50 | 50 |
| Total width of tie bar/ length of first sipe (%) | 25 | 15 | 20 | 30 | 35 |
| On-ice performance (score) | 105 | 105 | 104 | 104 | 103 |
| On-snow performarce (score) | 104 | 104 | 105 | 106 | 106 |

As shown in Table 1, it is confirmed that in the tire of each Example, excellent on-ice performance and on-snow performance are exhibited by suppressing snow clogging of the sipes.

In the tire according to the present disclosure, an angle of each first lateral groove relative to the tire axial direction can be 15 to 25°.

In the tire according to the present disclosure, an angle of the sipe relative to the tire axial direction can be 15 to 25°.

In the tire according to the present disclosure, the sipe can include a tie bar raised outwardly in a tire radial direction from a bottom thereof.

In the tire according to the present disclosure, a groove width of an end portion on an outer crown circumferential groove side of each first lateral groove can increase toward the outer crown circumferential groove side.

In the tire according to the present disclosure, a total length, along a longitudinal direction of the sipe, of the portion shallower than the maximum depth of the first lateral groove can be less than a total length, along the longitudinal direction, of the portion deeper than the maximum depth of the first lateral groove.

In the tire according to the present disclosure, the sipe can include a plurality of tie bars, and a width in the tire axial direction of a tie bar provided at a position overlapping a center in the longitudinal direction of the sipe can be less than a width of the other tie bar.

In the tire according to the present disclosure, the tread portion can include a second land portion adjacent to an inner tread end side of the first land portion, the second land portion can have a plurality of third lateral grooves, and each third lateral groove can be inclined in the second direction.

In the tire according to the present disclosure, an end portion on an inner crown circumferential groove side of each third lateral groove may not overlap a virtual region obtained by extending an end portion on the inner crown circumferential groove side of the first lateral groove so as to be parallel to the tire axial direction.

In the tire according to the present disclosure, the first land portion can have outer second lateral grooves communicating with an outer crown circumferential groove and terminating within the first blocks, the tread portion can include a third land portion adjacent to an outer tread end side of the first land portion, the third land portion can have a plurality of fourth lateral grooves fully traversing the third land portion, and each fourth lateral groove can face the outer second lateral groove across the outer crown circumferential groove.

In the tire according to the present disclosure, each fourth lateral groove can be inclined in the second direction.

In the tire according to the present disclosure, the tread portion can include a third land portion adjacent to an outer tread end side of the first land portion, the third land portion can have a plurality of termination grooves connected to an outer crown circumferential groove and terminating within the third land portion, and a virtual region obtained by extending an end portion on the outer crown circumferential groove side of each termination groove so as to be parallel to the tire axial direction can overlap at least a part of an end portion on the outer crown circumferential groove side of the first lateral groove.

As a result of adopting the above configuration(s), the tire according to the present disclosure (e.g., tire 1) can effectively suppress snow clogging of the sipes.

What is claimed is:

1. A tire comprising a tread portion, wherein
the tread portion includes a first land portion demarcated by a pair of circumferential grooves continuously each extending in a tire circumferential direction, and a plurality of first lateral grooves each inclined in a first direction relative to a tire axial direction and traversing the first land portion,
the first land portion includes a plurality of first blocks demarcated by the first lateral grooves,
each said first block has at least one sipe inclined in a second direction opposite to the first direction, relative to the tire axial direction,
each said at least one sipe includes a plurality of first portions each deeper than a maximum depth of each said first lateral groove, and a plurality of second portions each shallower than the maximum depth of each said first lateral groove,
each said at least one sipe includes a plurality of tie bar portions that are raised outwardly in a tire radial direction from a bottom of the sipe,
the plurality of tie bar portions include a first tie bar portion, a second tie bar portion, and a third tie bar portion between the first and second tie bar portions,
a width of the third tie bar portion is less than a width of each of the first and second tie bar portions,
a height of the third tie bar portion in the tire radial direction is less than a height of each of the first and second tie Tar portions in the tire radial direction,
wherein the first lateral grooves extend from one of the pair of circumferential grooves to the other of the pair of circumferential grooves so as to completely demarcate the first blocks,
wherein at least some of the sipes per block extend from one of the pair of circumferential grooves to the other of the pair of circumferential grooves,
wherein a maximum depth of each of the plurality of first portions, deeper than the maximum depth of each said first lateral groove, of each said at least one sipe, is 105% to 145% of the maximum depth of each said first lateral groove, and
wherein a minimum depth of each of the plurality of second portions, shallower than the maximum depth of each said first lateral groove, of each said at least one sipe, is 30% to 70% of the maximum depth of each said first lateral groove.

2. The tire according to claim 1, wherein an angle of each said first lateral groove relative to the tire axial direction is 15 to 25°.

3. The tire according to claim 1, wherein an angle of each said at least one sipe relative to the tire axial direction is 15 to 25°.

4. The tire according to claim 1, wherein
the first tie bar portion and the second tie bar portion are at opposite edges of the sipe, and the third tie bar portion, which is between the first and second tie bar portions, is at a position overlapping a center in a longitudinal direction of the sipe, and
the third tie bar portion is separated from each of the first tie bar portion and the second tie bar portion by one of the first portions that is recessed relative to a bottom of each said first lateral groove.

5. The tire according to claim 1, wherein a height in the tire radial direction of each of the tie bar portions is 40% to 70% of a maximum depth of the sipe.

6. The tire according to claim 1, wherein
the sipe extends in a zigzag manner in a longitudinal direction thereof, and
a width in the tire axial direction of the plurality of tie bar portions is 10% to 40% of a wavelength of the sipe.

7. The tire according to claim 1, wherein
each said first block has a second lateral groove that communicates with one of the circumferential grooves of the pair of the circumferential grooves and terminates within the first block, and
the first portion of each said at least one sipe is deeper than a maximum depth of the second lateral groove, and each of the plurality of second portions of each said at least one sipe is shallower than the maximum depth of the second lateral groove.

8. The tire according to claim 1, wherein
the first land portion is on a tire equator,
a center position in the tire axial direction of the first land portion is located on an inner tread end side with respect to the tire equator, and
the tread portion consists of five land portions including the first land portion.

9. The tire according to claim 8, wherein a groove width of an end portion on an outer crown circumferential groove side of each said first lateral groove increases toward the outer crown circumferential groove side.

10. The tire according to claim 1, wherein a total length, along a longitudinal direction of each said at least one sipe, of the plurality of second portions each shallower than the maximum depth of each said first lateral groove, is less than a total length, along the longitudinal direction, of the plurality of first portions each deeper than the maximum depth of each said first lateral groove.

11. The tire according to claim 1, wherein
the tread portion includes a second land portion adjacent to an inner tread end side of the first land portion,
the second land portion has a plurality of third lateral grooves,
each said third lateral groove is inclined in the second direction, and
all lateral grooves of the first land portion are inclined in a first same direction, and all sipes are inclined in a second same direction different from the first same direction.

12. The tire according to claim 11, wherein each of the third lateral grooves is offset from the first lateral grooves in the tire circumferential direction.

13. The tire according to claim 1, wherein
the first land portion has outer second lateral grooves communicating with an outer crown circumferential groove as one of the circumferential grooves of the pair of circumferential grooves and terminating within respective ones of the first blocks,
the tread portion includes a third land portion adjacent to an outer tread end side of the first land portion,
the third land portion has a plurality of fourth lateral grooves fully traversing the third land portion, and
each said fourth lateral groove faces a respective one of the outer second lateral grooves from across the outer crown circumferential groove.

14. The tire according to claim 13, wherein an angle between each said at least one sipe and each said first lateral groove is acute.

15. The tire according to claim 1, wherein
the tread portion includes a third land portion adjacent to an outer tread end side of the first land portion,
the third land portion has a plurality of termination grooves connected to an outer crown circumferential groove as one of the circumferential grooves of the pair of circumferential grooves and terminating within the third land portion, and
a virtual region obtained by extending an end portion on the outer crown circumferential groove side of each termination groove so as to be parallel to the tire axial direction overlaps at least a part of an end portion on the outer crown circumferential groove side of a corresponding one of the first lateral grooves.

* * * * *